May 15, 1951  A. BLANCHARD  2,553,233
METHOD FOR DETERMINING THE PRESENCE
OF GAS IN DISPERSIONS
Filed Feb. 17, 1945
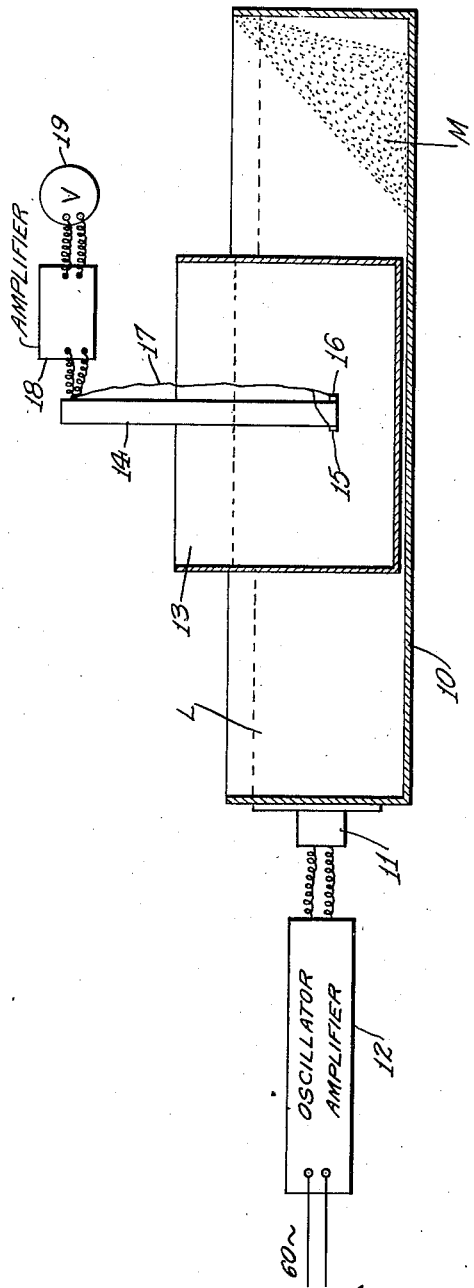
INVENTOR.
ANDRÉ BLANCHARD
BY
his ATTORNEYS

Patented May 15, 1951

2,553,233

UNITED STATES PATENT OFFICE 2,553,233

METHOD FOR DETERMINING THE PRESENCE OF GAS IN DISPERSIONS

André Blanchard, Houston, Tex., assignor to Schlumberger Well Surveying Corporation, Houston, Tex., a corporation of Delaware Application February 17, 1945, Serial No. 578,530

3 Claims. (Cl. 204—1)

This invention relates to methods and apparatuses for studying dispersions, and it relates particularly to methods for and apparatuses for determining the presence of gas in a dispersion of a solid in a liquid.

An object of the invention is to provide methods and apparatuses for detecting the presence of gas in dispersions of solids in liquids.

Other objects of the invention will become apparent from the following description of typical methods and a typical apparatus embodying the present invention.

In accordance with the present invention, a method and an apparatus are provided whereby the presence of gas in dispersions of solids in liquids may be readily determined by propagating elastic waves of an acoustic or ultrasonic frequency in such dispersions and measuring by means of a pair of electrodes the voltage developed in the dispersions.

More particularly, it has been determined that when elastic waves of acoustic or ultrasonic frequency are propagated in a dispersion containing a gas, the voltage developed between a pair of fixed electrodes will vary inversely as the gas concentration. Moreover, it is possible to obtain indications of the presence of gas by measuring the voltage developed in a dispersion at different distances from the wave emitter. Thus, the action of the dispersion in absorbing the waves in indicative of the presence of a medium such as gas that has the ability to absorb or attenuate the elastic waves. This latter factor is of considerable importance in detecting the presence of gas in the mud used in oil well operations, and the method and apparatus are sufficiently sensitive to provide an indication of the presence of gas in the mud in quantities that are not sufficient to be detected visually.

The method and the apparatus are, of course, best adapted to provide only relative indications, but such indications are of great value in the control of many operations wherein it is unnecessary to measure the exact gas concentration in a dispersion.

It is not clearly understood why the method and apparatus described generally above should produce these results, but it is believed that the following explanation may account for the results obtained. It will be understood, of course, that the invention should not be limited by the theory expressed hereinafter.

It is believed that the electric potentials produced by the elastic waves have the same origin and are of the same nature as those encountered in permeable materials or formations that are permeated with a liquid subjected to a static or varying pressure. When the pressure is static and the formation stationary, the flow of water or of the liquid with respect to the solid causes displacement of the ions in the external double layer which covers the interface solid-liquid (Helmholtz layer).

The electric current equivalent to the displacement of the ions of the external layer is, according to the Helmholtz theory for electrofiltration potentials, proportional to the velocity of the liquid with respect to the solid. It entails a return current through the surrounding liquid which is opposite to the ion current and produces a potential gradient proportional to the current and to the resistivity of the liquid.

It has been found that when the pressure is varying even at an ultrasonic frequency, the same phenomenon occurs and the ratio of the electric potentials developed to the pressure has almost the same order of magnitude as when the pressure is steady. However, since the pressure is varying, the electric potentials developed vary in a corresponding manner.

It is believed that the action of the solid particles in suspension in the liquid is similar to the action of the fixed formation except that the soild particles in the case of a suspension follow more or less the displacement of the liquid. However, because of the inertia of the particles, they do not comply fully with such liquid motion and a relative motion of the liquid and the particles takes place, with the result that the ions in the external double layer referred to above are displaced.

Under conditions in which a low frequency might be used for generating waves, the viscosity of the liquid is an important factor in determining the relative displacement of the particles. However, at higher frequencies, that is at higher acoustic and ultrasonic frequencies, apparently the viscosity of the liquid exerts a negligible effect on the relative motion of the liquid and the particles and can be disregarded.

The action of gas in attenuating the signal appears to be based upon the principle that the gas due to its resiliency will tend to absorb a minor part of the wave energy, and also to the fact that when the acoustic pressure varies around bubbles, it entails a process of evaporation and condensation inside the bubbles, which process is dissipative of energy.

Actually in practice it has been found that when a mud, taken directly from an oil well and containing appreciable quantities of gas, is subjected to ultrasonic waves, the elastic wave energy is highly attenuated. Under these conditions no potential would be developed even in close proximity to the face of the sound emitter. After the mud has been allowed to stand for a period of twenty-four hours so that the gas escapes, the attenuation is much less so that potential indications might be obtained at distances as great as several feet from the sound emitter.

When a gas is bubbled through the same mud, so that gas is absorbed therein, the propagation is again reduced to such an extent that measurable voltages cannot be obtained even in the vicinity of the wave emitter.

For a better understanding of the present invention, reference may be had to the accompanying drawing in which the single figure illustrates a typical form of apparatus for practicing the method.

The form of apparatus disclosed in the drawing includes an elongated receptacle 10 formed of metal, wood, or other material which is adapted to receive a body of liquid L, for example, water. At one end of the receptacle 10 is an acoustic or ultrasonic signal generator 11 which, for example, may be a quartz oscillator energized by a suitable oscillator-amplifier 12. The oscillator-amplifier may be supplied by 60 cycle alternating current in the usual way.

Preferably, the quartz oscillator 11 is designed to operate at high frequency, for example, about 30,000 cycles per second, although the frequency may be higher or lower, and any other kind of sound emitter could be used.

The receptacle or tank 10 may also receive a second tank 13 in which the dispersion to be investigated is received. The second tank 13 is not required, but its use facilitates the handling of the dispersions. Preferably the walls of the receptacle 13 are of a material highly permeable to elastic waves, such as for example, a thin synthetic resin or plastic which can readily transmit the wave vibrations from the transmitter 11.

The electrode construction may be of relatively simple nature and may suitably consist of a bar or strip 14 of an insulating material having the electrodes 15 and 16 on opposite sides thereof. The electrodes 15 and 16 preferably are spaced about one-half wave length apart in order to collect the maximum potential. As indicated above, the wave vibrations from the transmitter 11 produce periodic variations in the presssure in the dispersion so that an alternating potential difference is produced between the electrodes 15 and 16. The electrodes 15 and 16 may be connected by suitable twisted conductors 17 to an amplifier 18 and then to an indicating device 19 such as a voltmeter or recorder.

The apparatus may be used for detecting the presence of gas in dispersions, such as for example, the presence of gas in a drilling mud, by filling the receptacle 13 with the mud and placing the electrodes 15 and 16 therein. If an appreciable quantity of gas is present in the mud, no potential will be developed across the electrodes even in the immediate vicinity of the transmitter.

If desired, the apparatus may be installed to detect continuously the presence of gas in the drilling mud. The transmitter 11 and the electrodes may be installed permanently in the mud trough so that variation in the potential developed can be observed continuously as an indication of the presence of gas.

The operation of the apparatus disclosed in the drawing can be improved by partially filling the remote end of the receptacle 10 with an absorbent material M such as, for example, sand, having a surface inclined at an angle to the axis of the transmitter 11 so that reflected or standing waves are minimized in the liquid in the receptacle.

From the preceding description of typical methods and apparatus for practicing the invention, it will be apparent that they have many usages and are valuable for use in control of the physical characteristics of many different types of materials. It will be understood, of course, that the type of transmitter, the frequency of the elastic waves and the spacing of the electrodes and their construction may be modified widely. Therefore, the form of the apparatus and the methods disclosed herein should be considered as illustrative of the invention and not as limiting the scope of the following claims.

I claim:

1. In a method of obtaining indications of the presence of a gas in a dispersion of a solid in liquid, in which waves of acoustic or ultrasonic frequency are propagated in said dispersion, the step of obtaining indications of the dissipation of the energy of the waves by measuring potentials developed in said dispersion between points that are spaced apart in the direction of propagation of said waves.

2. In a method of continuously detecting the presence of gas in the circulating drilling mud in a well in which elastic waves are continuously propagated through a portion of the drilling mud while the mud is being circulated, the step of continuously measuring the voltage developed between a pair of locations in the drilling mud that are spaced apart in the direction of propagation of said waves.

3. In a method of determining the presence of gas in a dispersion of solid particles in a liquid, in which elastic waves of acoustic or ultrasonic frequency are propagated in said dispersion, the steps of obtaining an indication of the voltage developed between two positions in said dispersion that are spaced apart in the direction of propagation of said waves, obtaining an indication of the voltage developed between two other positions in said dispersion that are spaced apart in the direction of propagation of said waves from each other and from said first two positions, and comparing said voltages.

ANDRÉ BLANCHARD.

REFERENCES CITED

The following references are of record in the file of this patent:

UNITED STATES PATENTS

| Number | Name | Date |
|---|---|---|
| 2,156,259 | Blau | May 2, 1939 |
| 2,190,686 | Slichter | Feb. 20, 1940 |
| 2,378,237 | Morris | June 12, 1945 |

FOREIGN PATENTS

| Number | Country | Date |
|---|---|---|
| 508,675 | Great Britain | June 26, 1939 |

OTHER REFERENCES

"Electrocapillarity," by Butler, 1941, pp. 99 thru 102.

"Colloid Chemistry," by Alexander, vol. 5, 1944, pp. 367, 368.

"Philosophical Magazine," 7th series, vol. 26, July–Dec. 1938, pp. 674 thru 683.